US008289847B2

(12) United States Patent
Lefeuvre

(10) Patent No.: US 8,289,847 B2
(45) Date of Patent: Oct. 16, 2012

(54) METHODS FOR TRANSMITTING AND MANAGING VOICE FRAMES, COMPUTER PROGRAM PRODUCT, MEANS OF STORAGE AND CORRESPONDING DEVICES

(75) Inventor: Florian Lefeuvre, Toulouse (FR)

(73) Assignee: Sierra Wireless, Issy-les-Moulineaux Cedex (FR)

( * ) Notice: Subject to any disclaimer, the term of this patent is extended or adjusted under 35 U.S.C. 154(b) by 426 days.

(21) Appl. No.: 12/580,774

(22) Filed: Oct. 16, 2009

(65) Prior Publication Data

US 2010/0099400 A1    Apr. 22, 2010

(30) Foreign Application Priority Data

Oct. 17, 2008    (FR) ...................................... 08 57096

(51) Int. Cl.
*G01R 31/08* (2006.01)
(52) U.S. Cl. ........ 370/230; 370/235; 370/352; 370/338; 455/423; 455/556.1
(58) Field of Classification Search .............. 455/556.1, 455/556.2, 466, 458; 370/352–356
See application file for complete search history.

(56) References Cited

U.S. PATENT DOCUMENTS

| 5,740,542 | A * | 4/1998 | Leeper et al. ................. 455/516 |
| 6,463,080 | B1 * | 10/2002 | Wildey .......................... 370/508 |
| 6,781,971 | B1 * | 8/2004 | Davis et al. ................... 370/329 |
| 7,103,033 | B2 * | 9/2006 | Gao .............................. 370/352 |
| 7,110,357 | B2 * | 9/2006 | Yao et al. ...................... 370/230 |
| 7,787,377 | B2 * | 8/2010 | Hannu et al. .................. 370/235 |
| 2005/0088991 | A1 * | 4/2005 | Kil ................................ 370/329 |
| 2005/0250534 | A1 * | 11/2005 | Maurer ....................... 455/556.1 |
| 2007/0147237 | A1 | 6/2007 | Haddad et al. |
| 2007/0147327 | A1 | 6/2007 | Jin et al. |
| 2007/0153745 | A1 * | 7/2007 | Sun et al. ...................... 370/335 |

FOREIGN PATENT DOCUMENTS

| EP | 1732256 A1 | 12/2006 |
| WO | 9609708 A2 | 3/1996 |
| WO | 0078029 A1 | 12/2000 |

OTHER PUBLICATIONS

Search Report dated Jun. 17, 2009 for corresponding French Application No. 0857096 filed Oct. 17, 2008.

\* cited by examiner

*Primary Examiner* — Sharad Rampuria
(74) *Attorney, Agent, or Firm* — David D. Brush; Westman, Champlin & Kelly, P.A.

(57) ABSTRACT

A method of transmitting voice frames, via a transmission channel reserved for voice data, by a transmitting terminal generating voice frames using a voice signal is proposed. Such a method includes steps of: obtaining non-voice data; selecting voice data from the voice frame according to configuration data obtained beforehand relative to the transmission of non-voice data on the reserved channel; constructing of a degraded voice frame by replacing selected voice data with non-voice data; transmitting the degraded voice frame via the reserved channel to a receiving terminal. On the receiving terminal side, a method of managing voice frames coming from the transmitting terminal is proposed including the steps of: detecting a non-voice data header included in the voice frame; extracting, from the voice frame, of non-voice data, according to configuration data read in the header; transmitting of extracted non-voice data to a processor of non-voice data.

13 Claims, 8 Drawing Sheets

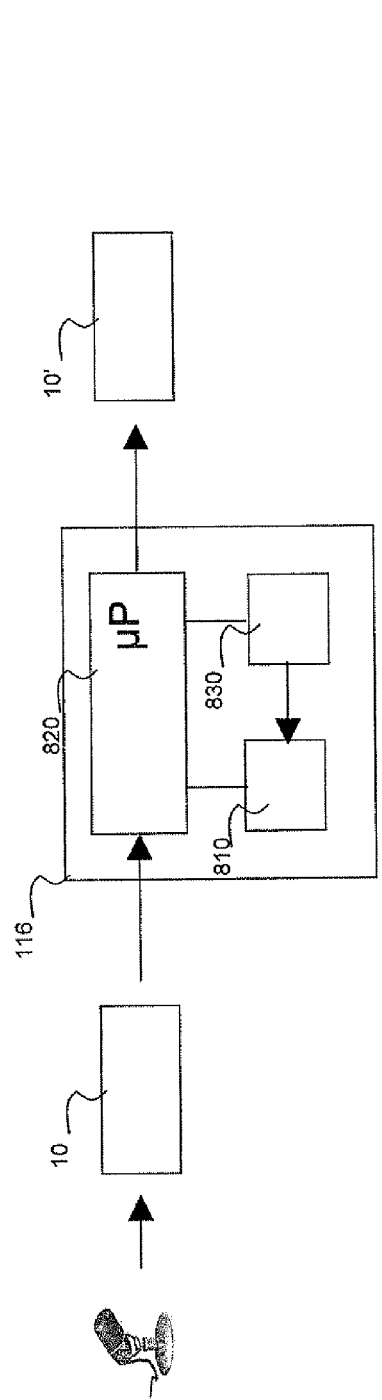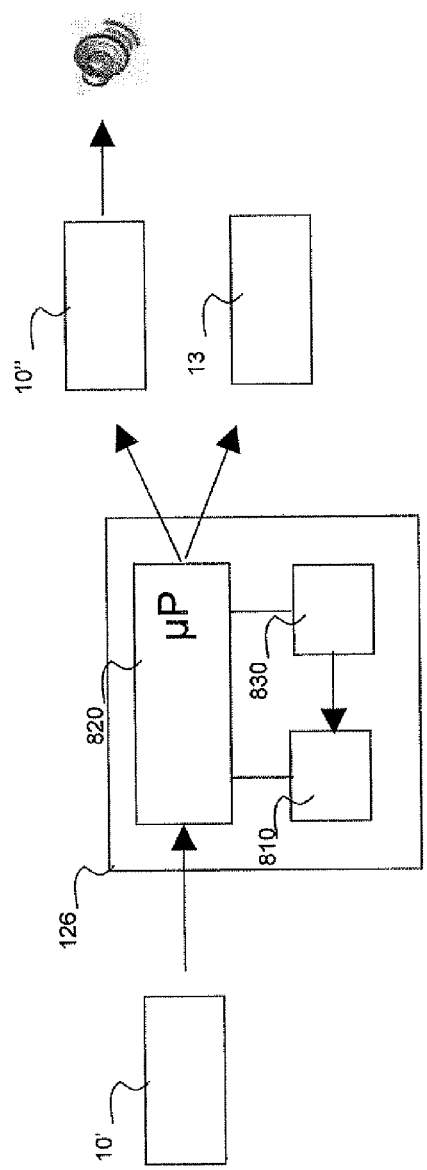
Figure 8a
Figure 8b
Figure 8

METHODS FOR TRANSMITTING AND MANAGING VOICE FRAMES, COMPUTER PROGRAM PRODUCT, MEANS OF STORAGE AND CORRESPONDING DEVICES

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of radiocommunications. More precisely, the disclosure relates to the managing of voice frames (also called speech frames) by radiocommunication devices, such as radiotelephones, PDAs (for "Personal Digital Assistant"), or on-board radiocommunication devices for example in machines.

The disclosure relates more particularly to the transmission, over the same transmission channel, of voice data and non-voice data, or simply data, by such devices.

Such non-voice data is already known in prior art. It includes in particular, but not exclusively, SMS text messages ("Short Message Service"), multimedia data (videos, images, etc.) and the data provided by positioning devices (GPS).

The disclosure applies in particular, but not exclusively, to radiocommunication devices without a SIM card (for "Subscriber Identity Module").

The disclosure in particular has applications within the framework of emergency calls by means of a radiotelephone without SIM card.

BACKGROUND OF THE DISCLOSURE

With a concern for simplifying the description, the remainder of this document is limited to describing the particular case wherein the radiocommunication device is a GSM radiocommunication terminal. Those skilled in the art will easily extend this knowledge to any other type of radiocommunication terminal.

Conventionally, a GSM radiocommunication terminal cannot access the services of the GSM network without a SIM card. Indeed, a SIM card is a module comprising all of the data concerning the subscriber, i.e. an identity number IMSI (for "International Mobile Subscriber Identity"), an authentication key Ki, as well as algorithms associated with the authentication of the subscriber by the GSM network.

As such, a GSM terminal including a SIM card can transmit voice data and non-voice data to other radiocommunication terminals via the GSM network.

The disadvantages of prior art shall be discussed hereinafter through the particular case wherein a user wants to transmit location information (for example GPS coordinates) during an emergency call.

A motorist who has a GSM terminal (for example a radiotelephone), including a SIM card, can, in the event of a breakdown, call the emergency services by dialing the number 112 (telephone number reserved for emergency calls and valid throughout the entire European Union) or call a breakdown mechanic.

In such a situation, the motorist can also use his GSM terminal to send, in the form of an SMS or calls of the DATA/GPRS type, non-voice data, for example, location information provided by a GPS device for example built into the vehicle. With the sending of this non-voice data, the motorist makes it possible for the assistance services or breakdown mechanic to locate him more quickly.

The inventors have observed that, in aforementioned cases of breakdown, certain motorists are in the incapacity of calling a breakdown mechanic or a close relation due to the fact that their GSM terminals do not include a SIM card or include a defective SIM card (i.e. a SIM card with erroneous data), or, under the effect of panic (for example in the event of a serious accident), the motorist may have blocked his SIM card by entering an incorrect password.

As such, in these conditions (GSM terminal without a SIM card), only the number 112 can be dialed. However, in certain situations, this emergency call is insufficient. Indeed, in the event of a serious accident, the motorist can have need of fast assistance. However, due to the fact that his GSM terminal does not include a SIM card, he is in the incapacity to send location information, obtained from the onboard GPS device in his vehicle. The first rescue assistance can therefore take a certain amount of time before arriving on the scene of the accident and to supply first aid to the motorist.

So there exists a real need to be able to transmit non-voice data over a transmission channel reserved for voice data. In other terms, there is a need to be able to transmit non-voice data during an emergency call with a radiocommunication terminal without a SIM card.

Different types of techniques for transmitting non-voice data over a transmission channel reserved for voice data are already known, in prior art.

Among the various types of known techniques, one technique in particular includes inserting into silent description frames (also called SID frame for "Silence Insertion Descriptor") non-voice data and transmitting the modified SID frames over a transmission channel reserved for voice data. This known technique is in particular discussed in the Patent US 2007/0147327 (PHILIPS).

Although effective, this known technique has a certain number of disadvantages.

Conventionally, a radiocommunication terminal comprises means of voice coding enabling to generate voice frames when a voice signal is present as input to the terminal (i.e. when a user speaks) and silent frames (also called SID frames for "Silence Identity Descriptor") when no voice signal is present as input to the terminal (i.e. when no vocal activity is detected).

A major disadvantage of the aforementioned known technique resides in the fact that the transmission of non-voice data over a communication channel reserved for voice data is conditioned by the absence of speech in terms of the user. As such, when a user is communicating with a person and wants to send this person non-voice data (for example digital photos), the user must interrupt his conversation during the entire duration of the transmission of non-voice data.

Furthermore, this known technique requires the implementation of an encapsulation mechanism (providing the insertion of non-voice data into the SID frame) that is costly in terms of calculation resources and electrical consumption.

SUMMARY

An exemplary aspect of the disclosure relates to a method for transmitting voice frames by a transmitting terminal the transmitting terminal comprising:

means for generating at least one voice frame using a voice signal, each voice frame comprising voice data;
means for transmitting said at least one voice frame to at least one receiving terminal, via a transmission channel reserved for voice data.

Such a method comprises the following steps:
obtaining configuration data relative to the transmission of non-voice data over said reserved transmission channel;
obtaining non-voice data;
for each voice frame generated by said means of generating:
selecting at least one piece of voice data from the voice data of said voice frame, said selecting being carried out according to said configuration data;
constructing a degraded voice frame by replacing said at least one piece of selected voice data with at least one of said pieces of non-voice data;
inserting of a non-voice data header into said degraded voice frame, said header including said configuration data;
transmitting, to the receiving terminal, said degraded voice frame including said header, via said reserved transmission channel.

As such, en exemplary aspect of the disclosure is based on, but not limited to, an entirely new and inventive approach for the transmitting of non-voice data over a transmission channel reserved for voice data. Indeed, an aspect of the disclosure relates to degrading voice data to the benefit of non-voice data. As such, an aspect of the disclosure replaces all or a portion of the voice data of a voice frame with non-voice data. According to an aspect of the disclosure, the degradation of the voice frame is conditioned by predetermined configuration data.

Note also that the non-voice data can be obtained by reading in a means of storage (as for example a database included in a mobile terminal) or by key-entry from a user on a man/machine interface. The non-voice data can also be obtained from an external piece of equipment via a communication link (wireless or wired).

Furthermore, note that the non-voice data can be a continuous data flow or a fixed-size data block.

As shall be seen in what follows, the header makes it possible for the receiving terminal to differentiate the non-voice data from the voice data in the degraded voice frame.

In this way, each degraded voice frame is transmitted over a transmission channel reserved for voice data with a header making it possible for the receiving terminal to differentiate the non-voice data from the voice data in the degraded voice frame. More precisely, the header makes it possible to locate the beginning and the end of the non-voice data included in the voice frame.

Advantageously, said configuration data includes a piece of information relative to a set of non-voice data to be inserted into each voice frame.

As such, it is possible to define a quantity of voice data to preempt in each voice frame. In other terms, it is possible to define the quantity of non-voice data to be transmitted over the reserved transmission channel. For example, an aspect of the disclosure makes it possible to replace 90%, 50%, 2%, etc. of the voice data of the voice frame.

According to an aspect of the disclosure, the configuration data can be provided either automatically (using an external device, for example, via a communication link) or manually by a user (for example via man/machine interface).

According to an alternative, said configuration data include a piece of information relative to a selection criterion of voice frames. In the event of a positive verification of said selection criterion, said step of selecting includes selecting all of the voice data of said voice frame.

As such, an aspect of the disclosure provides to degrade the voice frames, no longer systematically, but according to a predetermined selection criterion. For example, it is possible to entirely replace a voice frame with non-voice data every 100 ms.

Advantageously, the method comprises, in the event of a negative verification of said selection criterion, a step of transmitting said voice frame over said reserved transmission channel.

As such, when the selection criterion (time criterion) is not verified, the current voice frame is not degraded, the latter being directly transmitted to the means of transmitting.

Advantageously, said selection criterion is a timer.

In another embodiment, a method for managing voice frames by a receiving terminal is proposed, said receiving terminal comprising means for receiving at least one voice frame coming from a transmitting terminal, via a transmission channel reserved for voice data. Such a method comprises the following steps, for each voice frame received by said means for receiving:
detecting a non-voice data header included in said voice frame, said non-voice data header including configuration data relative to the transmission of non-voice data over said reserved transmission channel;
in the event of a positive detection, reading said configuration data;
constructing a partial voice frame by extracting, from said voice frame, at least one piece of non-voice data, according to said configuration data read;
transmitting said at least one piece of extracted non-voice data to means for processing non-voice data.

After reading the header included in the degraded voice frame, the receiving terminal locates without ambiguity the voice data and the non-voice data and as such extracts the non-voice data in order to transmit it to a dedicated application.

Preferentially, said configuration data includes a piece of information relative to all of the non-voice data included in said voice frame.

The receiving terminal as such knows the exact quantity of non-voice data to extract.

Preferentially, the method further comprises the following steps:
generating at least one piece of random voice data;
restoring a complete voice frame by inserting said at least one piece of random voice data into said partial voice frame;
transmitting said complete voice frame to means for decoding voice data.

The distortion effect after restoring the voice signal by the means of voice decoding is as such avoided.

In another embodiment, an aspect of the disclosure relates to a computer program product that can be downloaded from a communications network and/or recorded on a media that can be read by computer and/or which can be executed by a processor. This computer program product includes program code instructions for the implementation of the aforementioned method of transmission (in any one of its different embodiments) and/or of the aforementioned method of management (in any one of its different embodiments), when said program is executed on a computer.

In another embodiment, an aspect of the disclosure relates to a means of storage that can be read by computer, possibly totally or partially removable, storing a computer program comprising a set of instructions which can be executed by a computer in order to implement the aforementioned method of transmission (in any one of its different embodiments) and/or the aforementioned method of management (in any one of its different embodiments).

In another embodiment, a transmitting terminal is proposed intended for the transmission of voice frames comprising:
means for generating at least one voice frame using a voice signal, each voice frame including voice data;
first means for transmitting said at least one voice frame to at least one receiving terminal, via a transmission channel reserved for voice data.
The transmitting terminal further comprises:
first means for obtaining configuration data relative to the transmission of non-voice data over said reserved transmission channel;
second means for obtaining non-voice data;
means for selecting at least one piece of voice data from among the voice data of said voice frame, said selection being carried out according to said configuration data;
means for constructing a degraded voice frame by replacing said at least one piece of selected voice data with at least one of said pieces of non-voice data;
means for inserting a non-voice data header into said degraded voice frame, said header including said configuration data;
second means for transmitting, to the receiving terminal, said degraded voice frame including said header, via said reserved transmission channel.

In another embodiment, an aspect of the disclosure relates to a receiving terminal intended for managing voice frames comprising means for receiving at least one voice frame coming from a transmitting terminal, via a transmission channel reserved for voice data. Said receiving terminal further comprises:
means for detecting a non-voice data header included in said voice frame, said non-voice data header including configuration data relative to the transmission of non-voice data over said reserved transmission channel;
means for reading said configuration data, in the event of a positive detection;
means for constructing a partial voice frame itself including means for extracting making it possible to extract, from said voice frame, at least one piece of non-voice data, according to said configuration data read by said means for reading;
first means for transmitting said at least one piece of extracted non-voice data to the means for processing non-voice data.
Advantageously, the receiving terminal further comprises:
means for generating at least one piece of random voice data;
means for restoring a complete voice frame by inserting said at least one piece of random voice data into said partial voice frame;
second means for transmitting said complete voice frame to means of voice data decoding.

BRIEF DESCRIPTION OF THE DRAWINGS

Other characteristics and advantages shall appear when reading the following description, provided by way of a non-limiting example, and the annexed drawings, wherein:
FIGS. 8a and 8b respectively show the simplified structure of a particular embodiment of a device for transmitting and a device for receiving according to an aspect of the disclosure.

DETAILED DESCRIPTION OF ILLUSTRATIVE EMBODIMENTS

In all of the figures in this document, the elements and steps indicated are designated by the same numerical reference.

Figure 1:
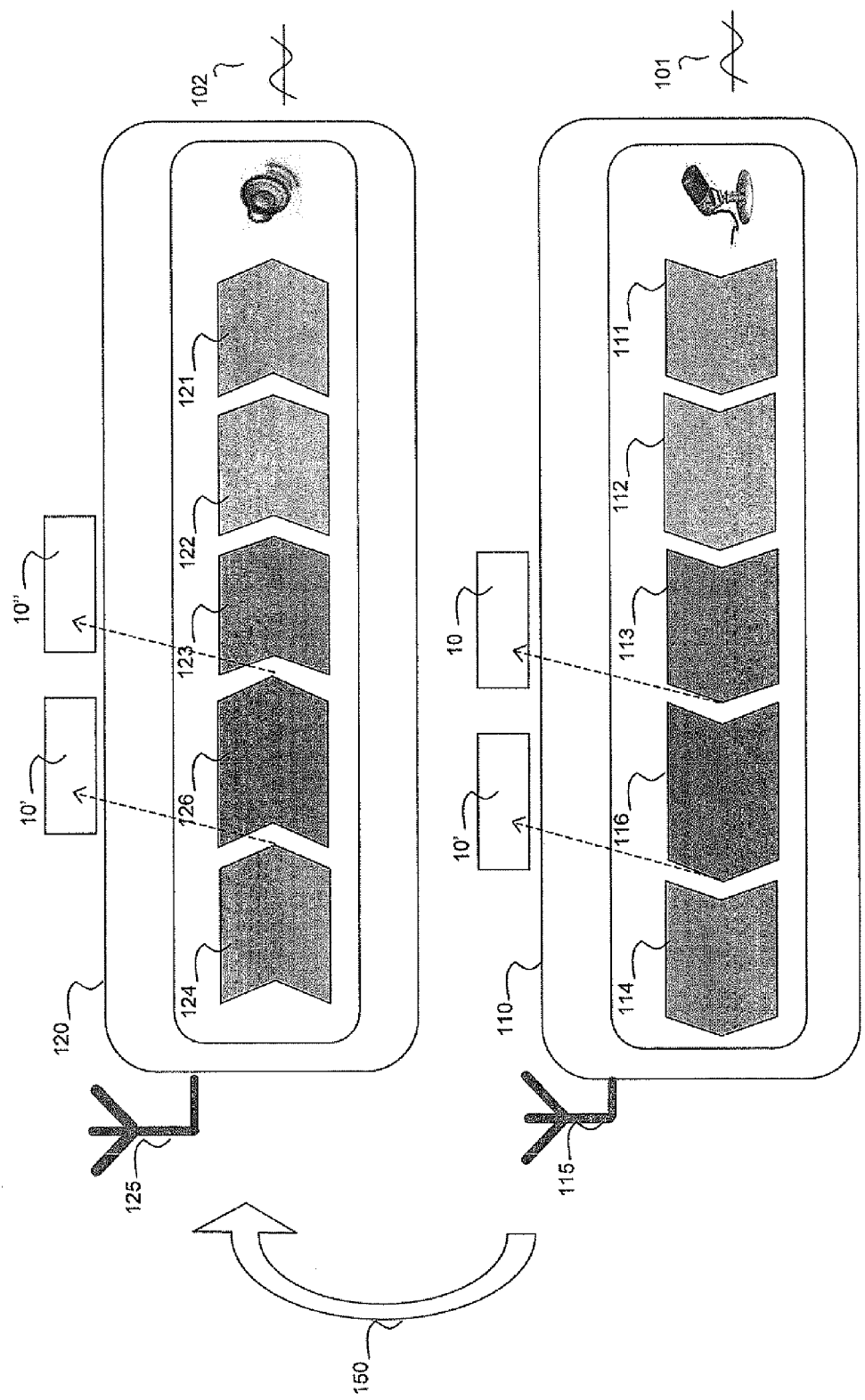
FIG. 1 shows an overview diagram implementing the device for transmitting voice frames, transmitter side, and a device for managing voice frames, receiver side, according to a particular embodiment of the disclosure.

In relation with FIG. 1, an overview diagram is shown implementing a device 116 for transmitting voice frames, transmitter side, and a device 126 for managing voice frames, receiver side, according to a particular embodiment of the disclosure.

On the transmitting terminal 110 side, a microphone interface 111 converts an analogue voice signal 101 into a digital voice signal, using for example an analogue-to-digital converter. Means of formatting (a formatter) 112 make it possible to format the digital voice signal before processing by a voice encoder 113.

The voice encoder 113, also called in what follows means of generating, code the voice signal coming from the means of formatting 112 (according to a coding that is proper to it), retaining only the fundamental components, in order to minimize the information (voice data) to be transmitted to the receiving terminal 120. The means of generating 113 then generates, at a determined frequency (for example every 20 ms within the framework of coding full rate speech), a voice frame 10.

Note that the means of generating 113 also make it possible to adapt the rate of the voice data which is transmitted over the GSM network.

Before proceeding with channel coding, the transmission device 116 implements, in a first step, for each voice frame 10 generated, a first preemption mechanism making it possible to select voice data belonging to voice frame 10. In a second step, the transmission device 116 implements a second mechanism for replacing preempted voice data with non-voice data. Such mechanisms result in obtaining a new voice frame, referred to as a degraded voice frame 10', making it possible to carry non-voice data over the transmission channel 150 reserved for voice data. The degraded voice frames 10' are then sent to a channel encoder 114, also called in what follows means of channel coding. These means of coding 114 supply, by the introduction of redundancy, a protection against transmission errors that can appear during the transmission of the voice frames over the GSM network. Each degraded voice frame is then modulated and transmitted by a transmitter (called means of transmitting) (not shown), via a transmission antenna 115, over the transmission channel 150 reserved for voice data.

On the receiving terminal 120 side, the degraded voice frames are received by a receiver (called means for receiving) (not shown), via a receiving antenna 125, then demodulated and sent to a channel decoder 124, also called means of channel decoding. In order to obtain voice frames that can be used by the voice decoder 123, also called means of voice decoding, the device for managing 126 is in charge, in a first step, of separating the voice data from the non-voice data. After extraction of the non-voice data from the degraded voice frame 10', the management device 126 is in charge, in a second step, of restoring a complete voice frame 10" (i.e. a frame including only voice data), then to send it to the voice decoder, also called means of voice decoding. The voice signal obtained after decoding is then processed by a formatter (also called means of formatting) 122 which formats the digital voice signal before processing by the earphone interface 121.

Finally, the earphone interface 121 converts the digital voice signal coming from the means of formatting 122 into an analogue voice signal 102.

Figure 2:
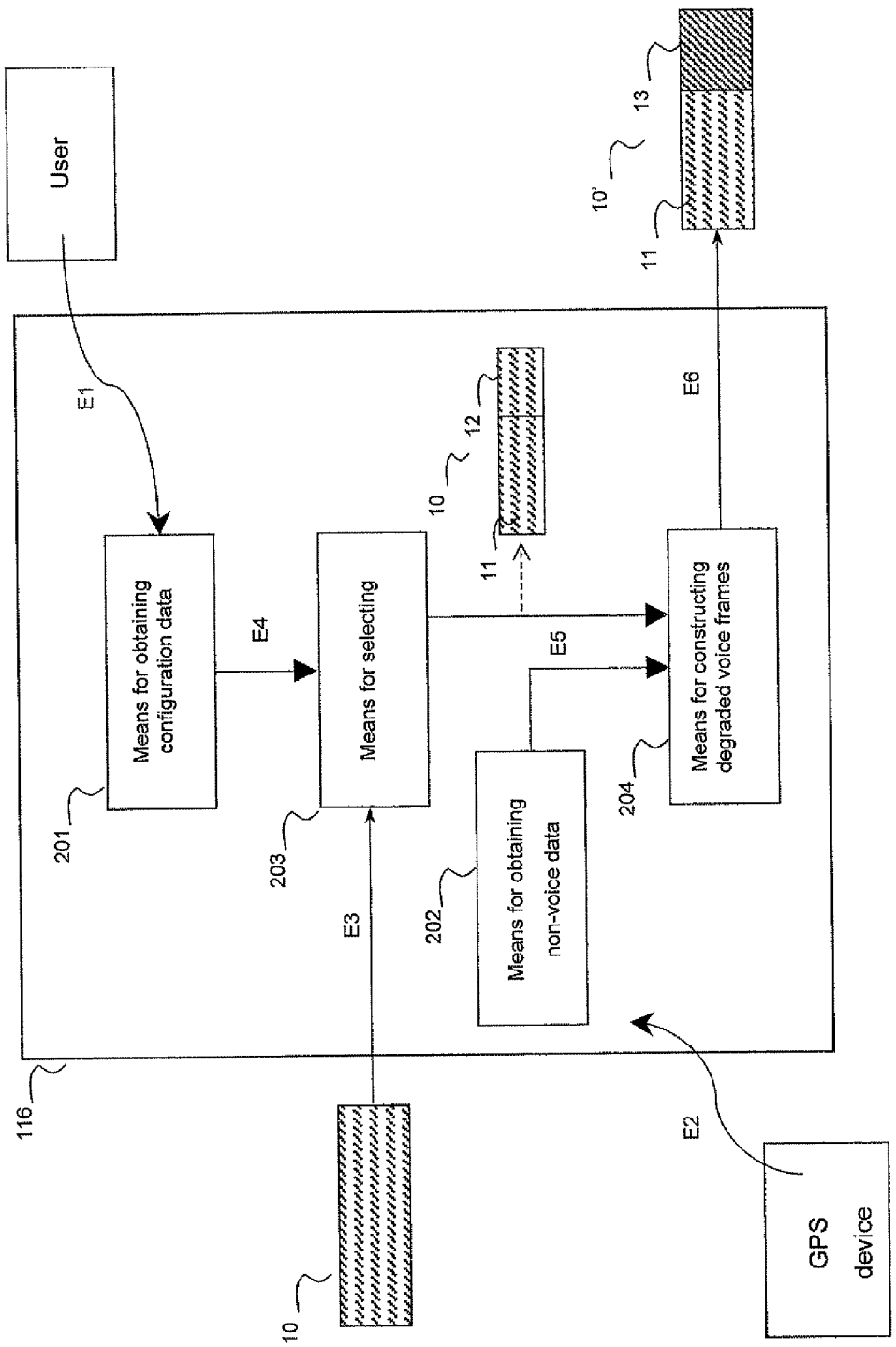
FIG. 2 shows a functional block diagram showing a particular embodiment of the method of transmission according to the disclosure.

In relation with FIG. 2, a functional block diagram showing a particular embodiment of the method of transmission according to an aspect of the disclosure is now described.

During a first step E1, a user enters, via a man/machine interface (not shown) of the radiocommunication terminal 110 for example, configuration data relative to the transmission of non-voice data over the transmission channel 150. Once the configuration data is validated by the user, it is transmitted to means of obtaining configuration data 201. By way of example, we shall consider a user entering a voice frame filling rate of 30%.

During a second step E2, an external piece of equipment (on-board GPS device for example) provides non-voice data (for example positioning data of the terminal 110), to means of obtaining non-voice data 202.

During a third step E3, a selector (means for selecting) 203 intercepts, as output from the means of generating 113, a voice frame 10. After having acknowledged the configuration data, during a fourth step E4, the means for selecting 202 are in charge of preempting, within the voice frame 10, a number of pieces of voice data which is according to the configuration data keyed in beforehand by the user. In the case at hand, the data block 12 constitutes the voice data of the voice frame which has been preempted. It corresponds in effect to the filling rate of 30% entered beforehand by the user.

During a fifth step E5, means for constructing 204 carry out a replacing of the preempted data (data block 11) with at least one portion of the positioning data received beforehand by the means of obtaining 202, in such a way that a degraded voice frame 10' is generated, the degraded voice frame comprising voice data (block referenced as 11) and non-voice data (block referenced as 13).

During a sixth step E6, the degraded voice frame is then transmitted to the means of channel coding 114.

Note that, as long as all of the non-voice data to be transmitted has not been fully transmitted over the transmission channel 150 reserved for voice data, the method of transmission is reiterated.

Figure 3:
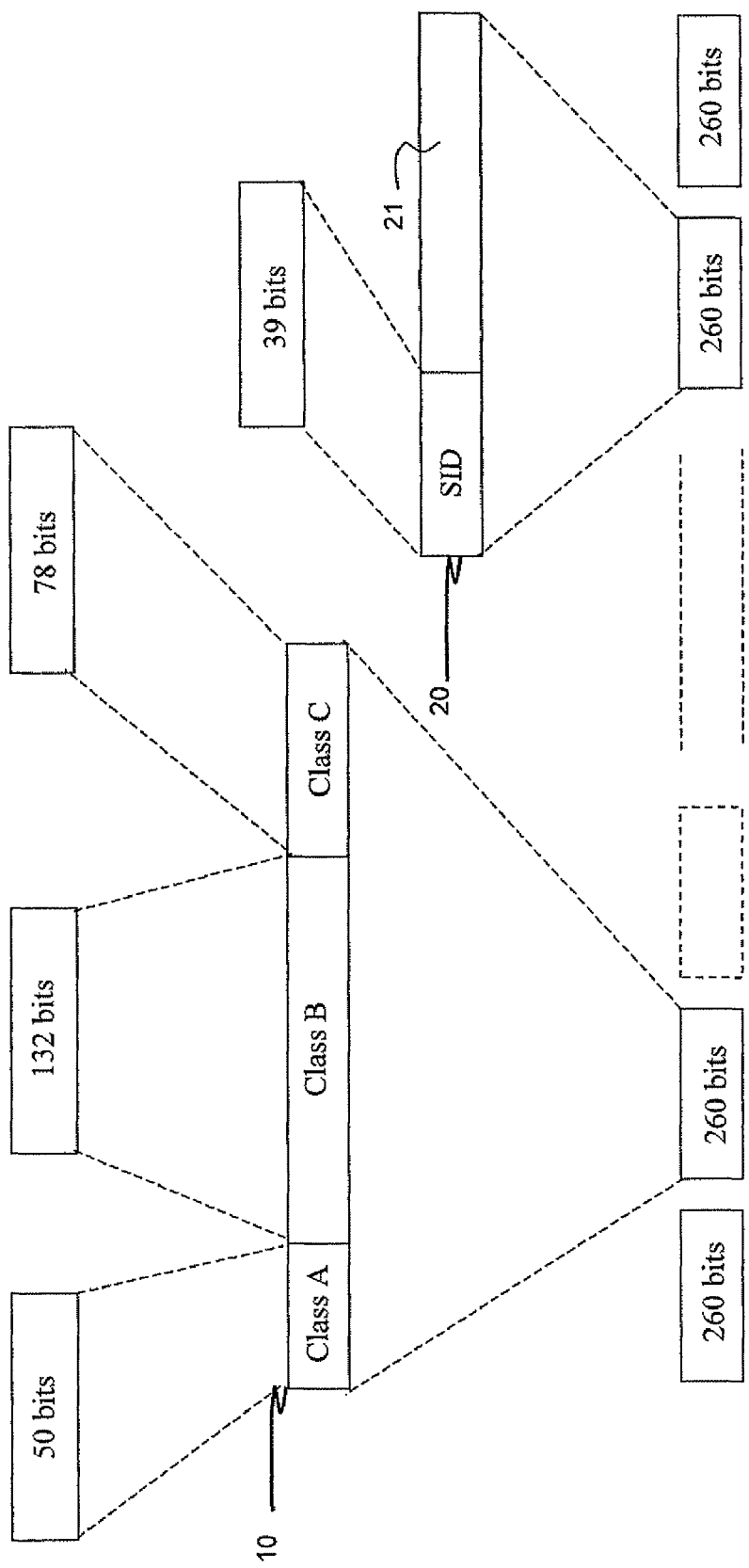
FIG. 3 shows a structure example of a voice frame and of a silent frame, within the framework of a full rate speech coding.

In relation with FIG. 3, a structure of a voice frame 10 and of a silent frame 20 are presented, within the framework of a coding of the full rate (FR) speech type.

Such as already mentioned hereinabove, in relation with prior art, according to the vocal activity at the input of a GSM radiocommunication terminal, either a voice frame 10 is generated in the event of vocal activity, or a SID frame (for "Silence Insertion Descriptor") is generated in the event of vocal inactivity.

As shown in FIG. 3, the voice frame 10 includes 260 voice data bits broken down into three packets of different classes (classes A, B and C). Indeed, during the transmission of voice data over a transmission channel 150 reserved for voice data, transmission errors can appear, the latter not being distributed equally over time. Conventionally, the means of generating 113 then distribute the bits of each voice frame 10 into several data packets according to their degrees of sensitivity to errors, the packet of class A being the packet that is the most sensitive to transmission errors. Within the framework of FR coding, each voice frame 10 includes three packets of different sizes: the packets of classes A, B and C comprise 50 bits, 132 data bits, and 78 data bits respectively. The packets of classes A and B are generally considered as packets of which the data have priority. Therefore, these packets will subsequently be protected by the channel coding. As for the packet of class C, it is considered as less important and as such will not benefit from channel coding.

Within the framework of this disclosure, it is possible for example to degrade a voice frame 10 by carrying out a replacing of all or a portion of the voice data of the packet of class C. As this packet is less important, it will advantageously be degraded first. An aspect of the disclosure also provides the possibility for example to degrade a voice frame by replacing all or a portion of the voice data of the packet of class C and all or a portion of the voice data of the packet of class B and/or all or a portion of the voice data of the packet of class A, according to the predetermined configuration data.

In a particular embodiment, an aspect of the disclosure can be implemented by degrading a silent frame 20. Such a frame includes a SID block of 39 bits, as well as an empty data block 21, this latter block able to be replaced, entirely or partially, with non-voice data.

Note that such a silent frame 20 does not come directly from the means of generating 113. Indeed, the means of generating 113 provide as output a SID frame of 39 data bits relative to the generation of a comfort noise for the receiving terminal. This SID frame is subsequently transformed, by a transformer (means of transformation) (not shown in the figures), into a particular voice frame, denoted as a silent frame 20, which is then transmitted to the means for selecting 203 of the transmission device. As such, the data contained in this silent frame 20 and which differ from the SID data (i.e. the data that will be, subsequently, introduced into the empty data block) will not be erased, on the receiving terminal side.

Recall that, in a particular embodiment, such erasures can occur when implementing data copy pr recopy mechanisms, or during the transfer of data over the network.

The receiving terminal 120 will then take into account the totality of the silent frame 20, rather than take into account, conventionally, only the 39 bits of the SID frame.

Figure 4:
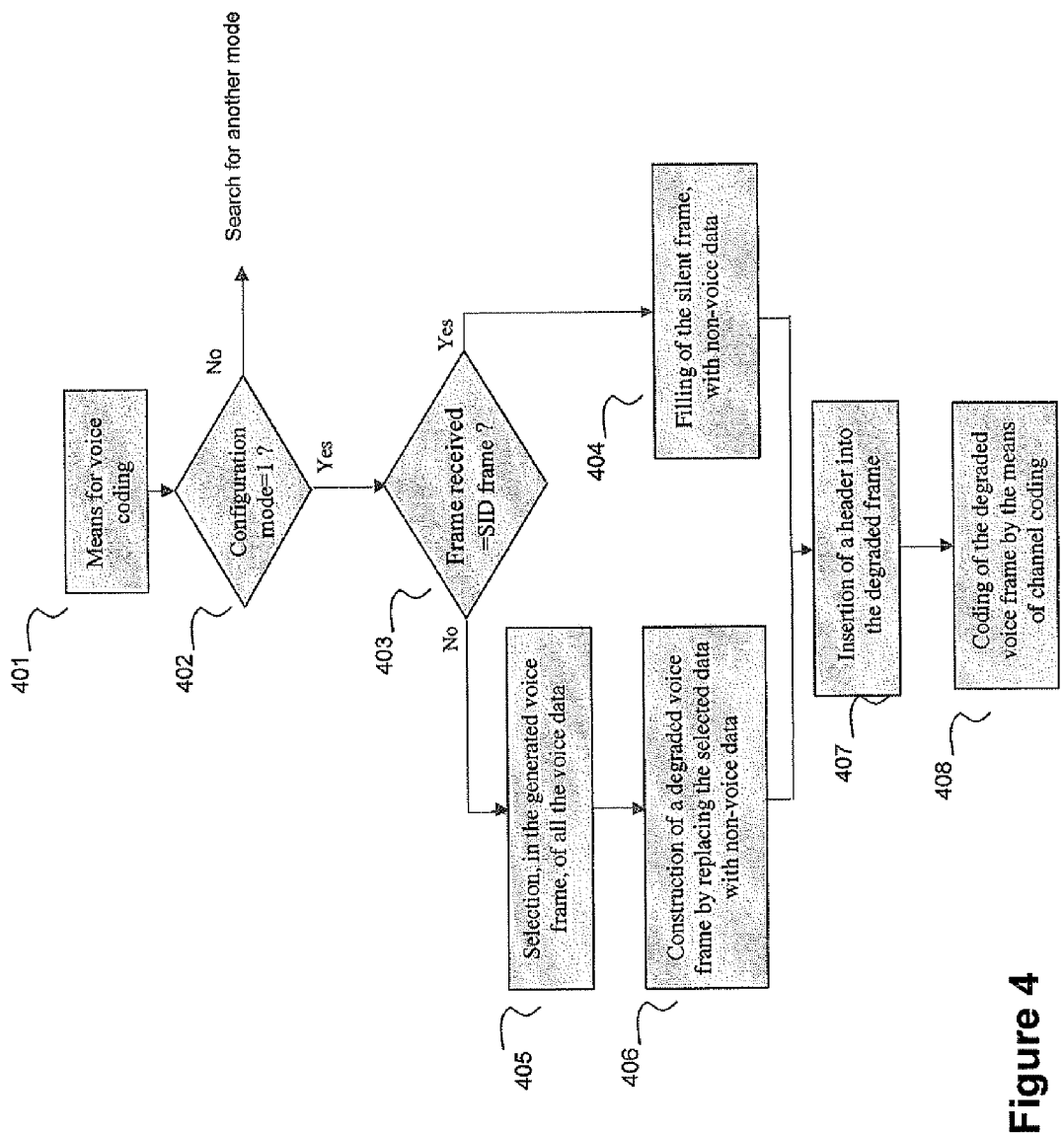
FIG. 4 shows a flow chart of an algorithm implementing the method of transmission according to an aspect of the disclosure, in the case where the rate of non-voice data is substantial.
Figure 5:
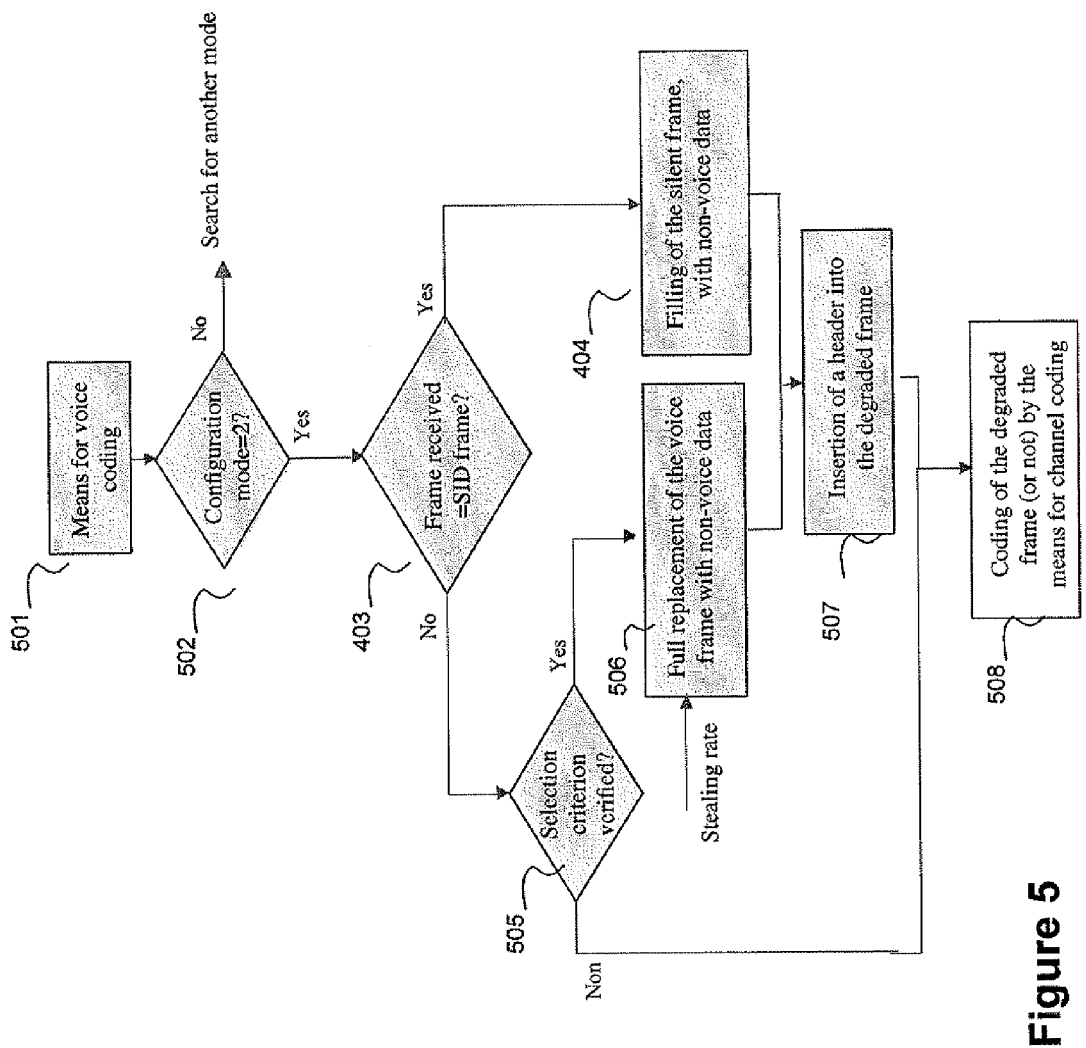
FIG. 5 shows a flow chart of an algorithm implementing the method of transmission according to an aspect of the disclosure, in the case where the rate of non-voice data is low.
Figure 6:
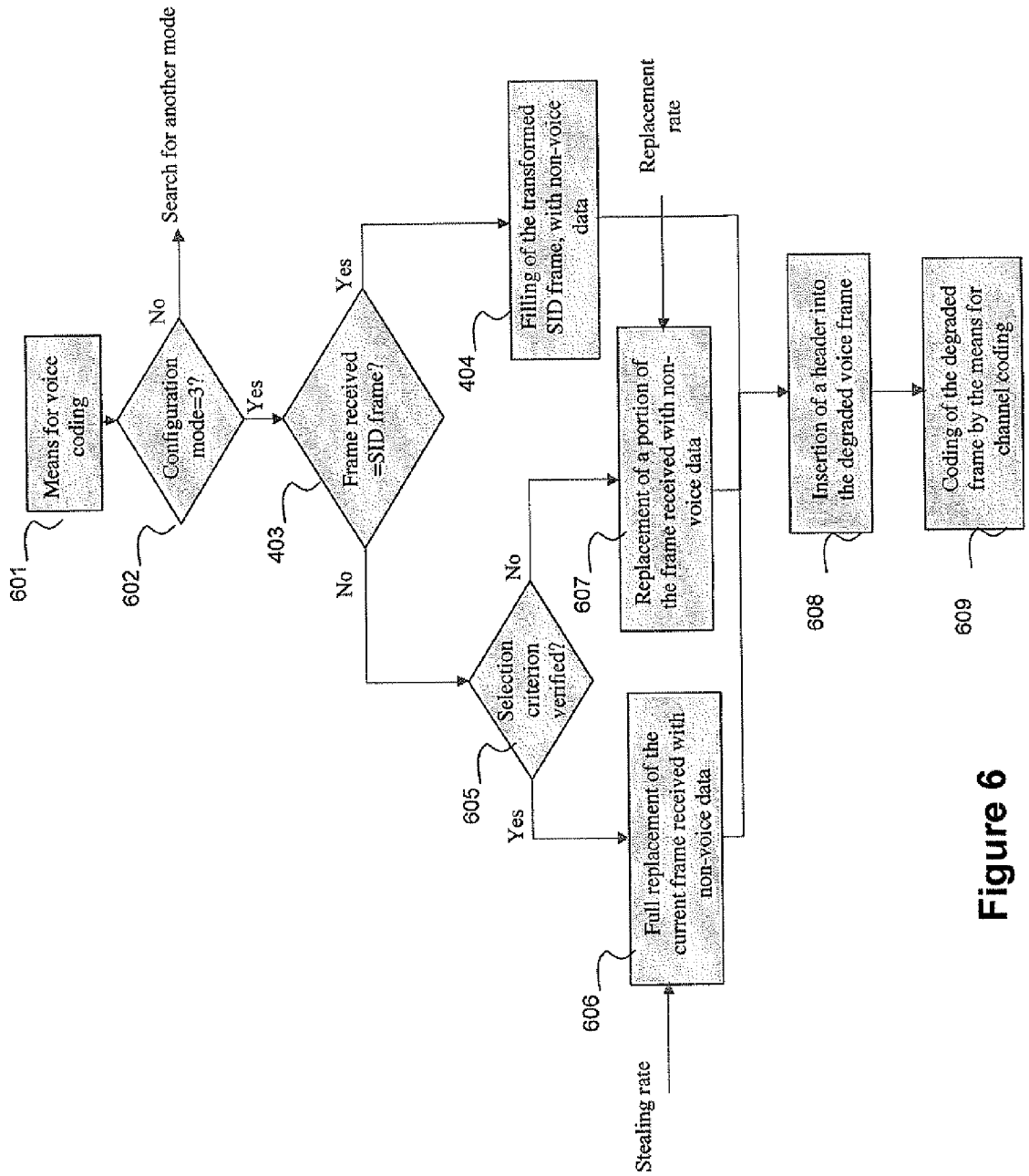
FIG. 6 shows a flow chart of an algorithm implementing the method of transmission according to an aspect of the disclosure, in the case where the rate of the non-voice data is average.

FIGS. 4, 5 and 6 described hereinafter show flow charts showing the method of transmission of a particular embodiment according to three configurations selected by a user of a GSM radiocommunication terminal.

In relation with FIG. 4, a flow chart of an algorithm making it possible to implement the method of transmission in the case where the rate of the non-voice data is high (configuration mode 1) is now shown.

This configuration mode shows, for example, the case of a user who wants to configure his GSM terminal in order to obtain a high rate of transmission for non-voice data. In this case, all of the voice data of each voice frame is replaced with non-voice data, until all of the non-voice data is transmitted over the GSM network.

During the step 401, the means of generating 113 generate a voice frame 10 which is intercepted by the means for selecting 203. During the following step 402, a verification is made as to whether or not the configuration data corresponds to the configuration mode 1. In the event of a negative verification, another configuration mode is then sought. In the event of a positive verification, the flow passes to step 403 in order to verify if the frame generated by the means of generating 113 corresponds to a silent frame 20.

If the frame generated corresponds to a SID frame, means of transformation (not shown in the figures) transform the SID frame into a silent frame 20, such as described in FIG. 3. The means for constructing 204 then complete the silent frame 20, during the step 404, by inserting non-voice data into the empty data block 21. A voice frame referred to as degraded is then obtained. During the step 407, the means for constructing 204 insert, into the degraded voice frame (and more precisely into the empty data block 21), a first header comprising information representing the presence of non-voice data and a second header comprising information representing the presence of an SID block in the degraded voice frame. The degraded voice frame 10' obtained as such comprises a SID data block, a specific header associated with the SID data, non-voice data and a specific header associated with the non-voice data.

In a particular embodiment, the header associated with the SID data and the header associated with the non-voice data can form only a single and same header in the degraded voice frames 10', i.e. one header grouping together the two aforementioned types of information.

If the frame generated corresponds to a voice frame, the flow passes to step 405 wherein all of the data of the voice frame 10 is selected by the means for selecting 203.

During the following step 406, a degraded data frame 10' is constructed by replacing, bit by bit, the selected voice data with the non-voice data obtained by the means of obtaining 202. For example, in the particular case of a voice coding of the Full Rate type, according to the configuration mode 1, it is possible to obtain a transmission of non-voice data with a rate close to 13 kbits/s.

During the step 407, the means for constructing 204 in addition carry out an insertion of a header into the degraded voice frame 10' including the information representing the presence of non-voice data in the voice frame, in order to inform the receiving terminal (and more precisely the management device 126), at the time of reception of the degraded voice frame, that it entails a voice frame that includes non-voice data. More precisely, the header contains a piece of information relative to the quantity of non-voice data included in the degraded voice frame 10'. In the case of the configuration mode 1, the header carries a piece of information indicating that the voice frame contains 100% non-voice data.

Finally, after having inserted the header into the degraded voice frame 10', the latter is then transmitted, by the means for constructing 204, to the means of channel coding 114 in charge of protecting, during the step 409, the non-voice data against transmission errors.

In relation with FIG. 5, a flow chart of an algorithm making it possible to implement the method of transmission in the case where the rate of non-voice data is low (configuration mode 2) is now shown.

This configuration mode shows, for example, the case of a user who configures his radiocommunication terminal in such a way that the rate of transmission of non-voice data is particularly low. The quality of the voice in this configuration mode is thus preserved.

During the step 501, the means of generating 113 generate a voice frame 10 which is intercepted by the means for selecting 203. During the following step 502, a verification is made as to whether or not the configuration data corresponds to the configuration mode 2. In the event of a negative verification, another configuration mode is then sought. In the event of a positive verification and as shown previously in relation with FIG. 4, a verification is made in step 403 as to whether or not the frame generated by the means of generating 113 corresponds to a silent frame 20.

If the frame intercepted by the means for selecting 203 corresponds to a silent frame 20, then the means for constructing 204 complete the silent frame 20, during the step 404, by inserting non-voice data into the empty data block 21. A voice frame referred to as degraded is thus obtained. During the step 507, the means for constructing 204 insert also, into the degraded voice frame (and more precisely into the empty data block 21), a first header including information representing the presence of non-voice data into the degraded voice frame and a second header comprising information representing the presence of a SID block into the degraded voice frame. The degraded voice frame 10' obtained as such includes a SID data block, a specific header associated with the SID data, non-voice data and a specific header associated with the non-voice data.

If the frame generated is a voice frame 10, flow is passed to step 505 wherein a selection criterion (time criterion) is verified. The selection criterion is based on a timing that can in particular be carried out using a timer. When the timer is activated, it grants a period of time during the unfolding of the method in order to trigger the selection of a voice frame. In other terms, this mechanism (which can be defined by a frame stealing rate) makes it possible to select, then degrade a frame from among a plurality of voice frames generated by the means of generating 113, in such a way that there are enough non-degraded voice frames to have the possibility of restoring an audible analogue voice signal on the receiving terminal. Indeed, GSM terminals are generally designed to operate correctly despite the loss of frames. By way of example, a stealing rate of 20% entered by a user makes it possible to inform the means for selecting 203 that a voice frame to be degraded must be selected every 100 ms. During the step 506, the means for constructing 204 carry out, for each selected voice frame, a replacing of all of the voice data of the voice frame 10 with the non-voice data, resulting in the construction of a degraded voice frame 10'.

During the step 507, the means for constructing 204 further carry out an insertion of a header into the degraded voice frame 10' comprising information representing the presence of non-voice data in the voice frame, in order to inform the receiving terminal (and more precisely the management device 126), during the reception of the degraded voice frame 10', that it entails a voice frame including non-voice data.

If, in step 505, no selection criterion is verified, the voice frame does not undergo any modification. This voice frame, not degraded, is then directly transmitted to the means of channel coding 114 in charge of protecting, during the step 508, the data against the transmission errors.

In relation with FIG. 6, a flow chart of an algorithm making it possible to implement the method of transmission in the case where the rate of non-voice data to be transmitted is average (configuration mode 3) is now presented.

During the step 601, the means of generating 113 generate a voice frame 10 which is intercepted by the means for selecting 203. During the following step 602, a verification is made as to whether or not the configuration data corresponds to the configuration mode 3. In the event of a negative verification, another configuration mode is then sought. In the event of a positive verification and as shown previously in relation with FIGS. 4 and 5, a verification is made, in step 403, as to whether or not the frame generated by the means of generating 113 corresponds to a silent frame 20.

If the frame intercepted by the means for selecting 203 corresponds to a silent frame 20, then the means for constructing 204 completes the silent frame 20, during the step 404, by inserting non-voice data into the empty data block 21 of the silent frame 20. A voice frame referred to as degraded is then obtained. During the step 608, the means for constructing 204 also insert into the degraded voice frame (and more precisely into the empty data block 21) a first header comprising information representing the presence of non-voice data in the degraded voice frame and a second header comprising information representing the presence of a SID block into the transformed SID frame. The degraded voice frame 10' obtained as such includes a SID data block, a specific header associated with the SID data, non-voice data and a specific header associated with the non-voice data.

If the frame generated is a voice frame 10, flow is passed to step 605 wherein the selection criterion of voice frame must be verified, as shown in relation with FIG. 5. In the event of a positive verification, for each voice frame selected, the means for constructing 204 carry out, during the step 606, a replacing of all of the data of the selected voice frame with non-voice data.

In the event of a negative verification, the means for constructing 204 carry out, during the step 607, for each voice frame selected, a replacing of a portion of the voice data of the voice frame 10 with the non-voice data according to a predetermined filling rate. For example, in the particular case of a FR voice coding, if a user enters a replacement rate of 30%, i.e. a rate that allows only the data of the packet of class C to be replaced, it is possible to obtain a transmission of non-voice data with a rate close to 3.9 kbits/s (78 bits every 20 ms).

Advantageously, as the replacement rate can be set during the key-entry of the configuration data, it is possible to adjust the rate of transmission of non-voice data, while still controlling the transmission quality of the voice.

Then, during the step 608, the means for constructing 204 further carry out an insertion of a header, into the degraded voice frame 10', including the information representing the presence of non-voice data in the voice frame, in order to inform the receiving terminal (more precisely a management device 126), at the time of the reception of the degraded voice frame 10', that it entails a voice frame including only non-voice data (if the step 606 is executed) or a voice frame including voice data and non-voice data (if the step 607 is executed), or that it entails a voice frame including non-voice data and SID data (if the step 604 is executed). In this latter case, the degraded voice frame 10' can also include an additional specific header associated with the SID data, in order to indicate, to the receiving terminal, the presence of a SID block in the degraded frame 10'.

Finally, each degraded voice frame 10', is then directly transmitted to the means of channel coding 114 in charge of protecting, during the step 609, the data against transmission errors.

Figure 7:
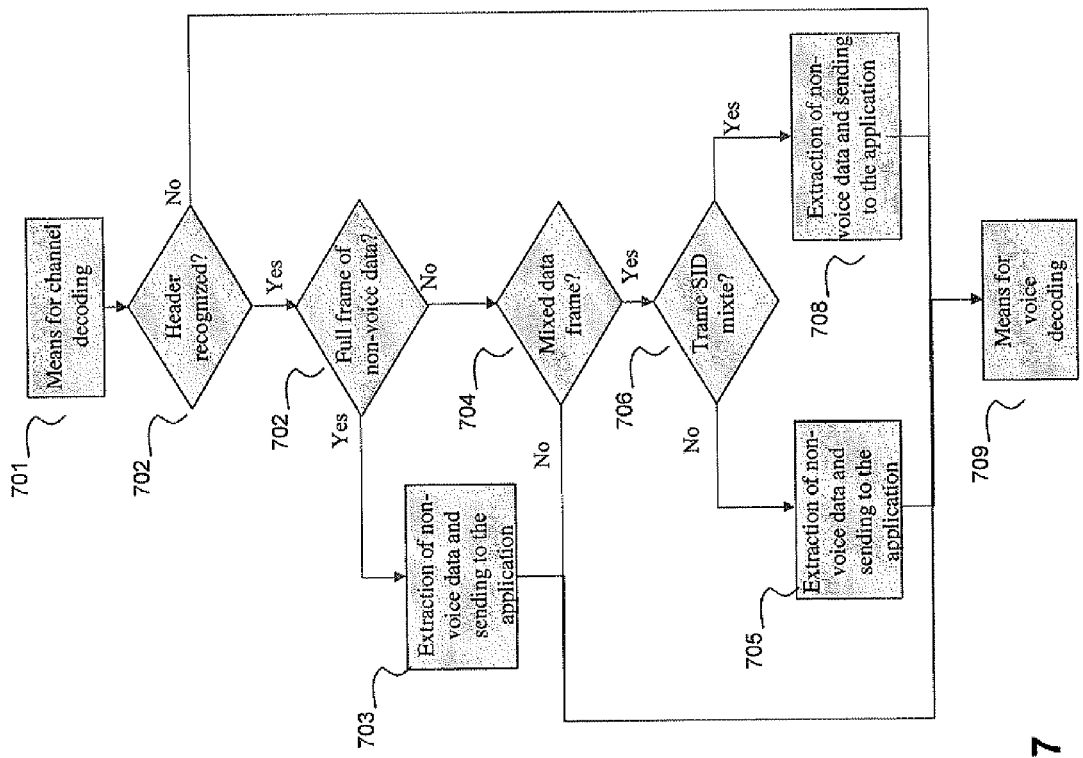
FIG. 7 shows a flow chart of an algorithm implementing the method of management according to a particular embodiment of the disclosure.

In relation with FIG. 7, a flow chart of an algorithm making it possible to implement the method of reception according to a particular embodiment is now shown.

The method of management begins at step 701 wherein the means of channel decoding carries out a decoding of each degraded voice frame 10' received, via the transmission channel 150. During the step 702, i.e. before the transfer of the frames, conventionally, using means of decoding 123, each frame is intercepted in order to carry out a test for detecting a header. Two cases are possible.

When no header is detected in the voice frame received, the voice frame is considered to be a conventional voice frame (i.e. not degraded). In this case, during the step 703, the latter is sent directly to the means of voice decoding 213 for a voice data processing in the step 709.

When a header is detected within the voice frame received, in the step 702, the voice frame is considered to be a degraded voice frame 10' and a step of reading the header is carried out in order to know the exact constitution of this voice frame 10'. According to the data contained in the header, three cases are possible.

In a first case, the data contained in the header indicate that the degraded voice frame contains only non-voice data. The step 703 is then executed. All of the non-voice data is extracted from the degraded voice frame 10' and replaced with random voice data. This operation makes it possible to restore a complete voice frame 10" in order to minimize the risk of distortion that can appear during the restoring of the analogue voice signal. The restored voice frame 10" is transmitted to the means of voice decoding 213 during the step 709. The extracted non-voice data is sent to an application.

In a second case (step 704), the data contained in the header indicates that the degraded voice frame 10' contains voice and non-voice data (referred to as a mixed data frame). The step 705 is then executed. The portion of non-voice data is extracted from the degraded voice frame 10' and replaced with random voice data, in order to minimize the risk of distortion of the voice signal. The restored voice frame 10" is transmitted to the means of voice decoding 213 during the step 709. The extracted non-voice data is sent to an application.

In a third case (step 706), according to a particular embodiment, the data contained in the header indicates that the degraded voice frame is a frame containing a SID data block and non-voice data.

In an alternative of an embodiment, a first header (associated with the SID data) indicates that the frame contains a SID block and a second header (associated with the non-voice data) indicates that the frame contains non-voice data.

The step 707 is then executed. The portion of non-voice data is extracted from the degraded voice frame and sent to an application. The SID data is transmitted to the means of voice decoding 213, during the step 709.

Note that, in the case of a silent frame, it is not necessary to generate random data to replace the portion of non-voice data extracted from the silent frame.

FIGS. 8a and 8b schematically show the structure of a device for transmitting voice frames 116 (FIG. 8a) and a device for managing voice frames 126 (FIG. 8b) according to a particular embodiment.

In relation with FIG. 8a, the transmission device 116 includes a memory 810, and a processing unit 820 provided with a microprocessor μP (such as a signal processing microprocessor (DSP for "Digital Signal Processor" for example), which is driven by a computer program (or application) 830 implementing the method of transmission according to an aspect of the disclosure. The processing unit 820 receives as input a voice frame 10. The microprocessor μP processes this voice frame 10, according to the instructions of the program 830, in order to obtain a degraded voice frame 10' according to predetermined configuration data.

In relation with FIG. 8b, the managing device 126 includes a memory 810, and a processing unit 820 provided with a microprocessor μP (such as a signal processing microprocessor (DSP for "Digital Signal Processor" for example), which is driven by a computer program (or application) 830 implementing the method of management according to an aspect of the disclosure. The processing unit 820 receives as input a degraded voice frame 10'. The microprocessor μP processes this voice frame, according to the instructions of the program 830, in order to, on the one hand, extract the non-voice data 13 and sent it to an application, and on the other hand, to obtain a restored voice frame 10".

An exemplary embodiment of the disclosure provides a technique for transmitting non-voice data over a transmission channel reserved for voice data that is effective and simple to implement.

An exemplary embodiment of the disclosure provides a technique that allows a user to send non-voice data without interrupting his discussion with the other party.

An exemplary embodiment of the disclosure provides such a technique that makes it possible to reduce the costs of transmission of non-voice data.

An exemplary embodiment of the disclosure provides such a technique that makes it possible to optimize the transmission of non-voice data according to the desired rate.

An exemplary embodiment of the disclosure provides such a technique that makes it possible to increase the reliability of the transmissions of non-voice data over a transmission channel reserved for voice data.

An exemplary embodiment of the disclosure provide such a technique that is inexpensive and compatible with all of the existing communications networks.

Although the present disclosure has been described with reference to one or more examples, workers skilled in the art will recognize that changes may be made in form and detail without departing from the scope of the disclosure and/or the appended claims.

What is claimed is:

1. A method of transmitting voice frames by a transmitting terminal, said method comprising:
   generating at least one voice frame from a voice signal, each voice frame comprising voice data;
   obtaining configuration data relative to transmission of non-voice data over a transmission channel reserved for voice data;
   obtaining non-voice data; and
   for each voice frame generated from said voice signal:
   selecting at least one piece of voice data among the voice data of said voice frame, said selecting being carried out as a function of said configuration data;
   constructing a degraded voice frame by replacing said at least one piece of selected voice data with at least one of said pieces of non-voice data;
   inserting a non-voice data header into said degraded voice frame, said header comprising said configuration data; and
   transmitting, to at least one receiving terminal, said degraded voice frame including said header, via said reserved transmission channel.

2. The method according to claim 1, wherein said configuration data comprises a piece of information relative to a set of non-voice data to be inserted into each voice frame.

3. The method according to claim 1, wherein said configuration data comprises a piece of information relative to a selection criterion of voice frames,
and wherein, in the event of a positive verification of said selection criterion, said step of selecting comprises selecting all the voice data of said voice frame.

4. The method according to claim 3, wherein the method comprises, in the event of a negative verification of said selection criterion, a step of transmitting said voice frame over said reserved transmission channel.

5. The method according to claim 3, wherein said selection criterion comprises a timer.

6. A method of managing voice frames by a receiving terminal, said method comprising:
   receiving at least one voice frame coming from a transmitting terminal, via a transmission channel reserved for voice data,
   for each voice frame received by said receiving terminal:
   detecting a non-voice data header comprised in said voice frame, said non-voice data header comprising configuration data relative to the transmission of non-voice data over said reserved transmission channel;
   in the event of a positive detection, reading said configuration data;
   constructing a partial voice frame by extracting, from said voice frame, at least one piece of non-voice data, as a function of configuration data read; and
   transmitting said at least one piece of extracted non-voice data to a processor of non-voice data.

7. The method according to claim 6, wherein said configuration data comprises a piece of information relative to a set of non-voice data comprised in said voice frame.

8. The method according to claim 6, wherein the method further comprises the following steps:
   generating at least one piece of random voice data;
   restoring a complete voice frame by inserting said at least one piece of random voice data into said partial voice frame;
   transmitting said complete voice frame to a decoder for decoding voice data.

9. A memory that can be read by computer, storing a computer program comprising a set of instructions which can be executed by a computer in order to implement a method of transmitting voice frames by a transmitting terminal, said method comprising:
   generating at least one voice frame from a voice signal, each voice frame comprising voice data;
   obtaining configuration data relative to the transmission of non-voice data over a transmission channel reserved for voice data;
   obtaining non-voice data; and
   for each voice frame generated from said voice signal:
   selecting at least one piece of voice data among the voice data of said voice frame, said selecting being carried out as a function of said configuration data;
   constructing a degraded voice frame by replacing said at least one piece of selected voice data with at least one of said pieces of non-voice data;
   inserting a non-voice data header into said degraded voice frame, said header comprising said configuration data; and
   transmitting, to at least one receiving terminal, said degraded voice frame including said header, via said reserved transmission channel.

10. A memory that can be read by computer, storing a computer program comprising a set of instructions which can be executed by a computer in order to implement a method of managing voice frames by a receiving terminal, said method comprising:

receiving at least one voice frame coming from a transmitting terminal, via a transmission channel reserved for voice data, for each voice frame received by said receiving terminal:

detecting a non-voice data header comprised in said voice frame, said non-voice data header comprising configuration data relative to the transmission of non-voice data over said reserved transmission channel;

in the event of a positive detection, reading said configuration data;

constructing a partial voice frame by extracting, from said voice frame, at least one piece of non-voice data, as a function of configuration data read; and transmitting said at least one piece of extracted non-voice data to a processor of non-voice data.

11. A transmitting terminal for transmitting voice frames comprising:

means for generating at least one voice frame from a voice signal, each voice frame including voice data;

first means for transmitting said at least one voice frame to at least one receiving terminal, via a transmission channel reserved for voice data, first means for obtaining configuration data relative to the transmission of non-voice data over said reserved transmission channel;

second means for obtaining non-voice data;

means for selecting at least one piece of voice data among the voice data of said voice frame, as a function of said configuration data;

means for constructing a degraded voice frame by replacing said at least one piece of selected voice data with at least one of said pieces of non-voice data;

means for inserting a non-voice data header into said degraded voice frame, said header comprising said configuration data; and second means of transmitting, to the receiving terminal, of said degraded voice frame comprising said header, via said reserved transmission channel.

12. A receiving terminal for managing voice frames comprising:

means for receiving at least one voice frame coming from a transmitting terminal, via a transmission channel reserved for voice data;

means for detecting a non-voice data header comprised in said voice frame, said non-voice data header comprising configuration data relative to the transmission of non-voice data over said reserved transmission channel;

means for reading said configuration data;

means for constructing a partial voice frame comprising means for extracting, from said voice frame, at least one piece of non-voice data, as a function of said configuration data read by said means for reading; and first means for transmitting said at least one piece of extracted non-voice data to means for processing non-voice data.

13. The receiving terminal according to claim 12, wherein the receiving terminal further comprises:

means for generating at least one piece of random voice data;

means for restoring a complete voice frame by inserting said at least one piece of random voice data into said partial voice frame; and second means for transmitting said complete voice frame to means for decoding voice data.

* * * * *